United States Patent Office 3,344,313
Patented Sept. 26, 1967

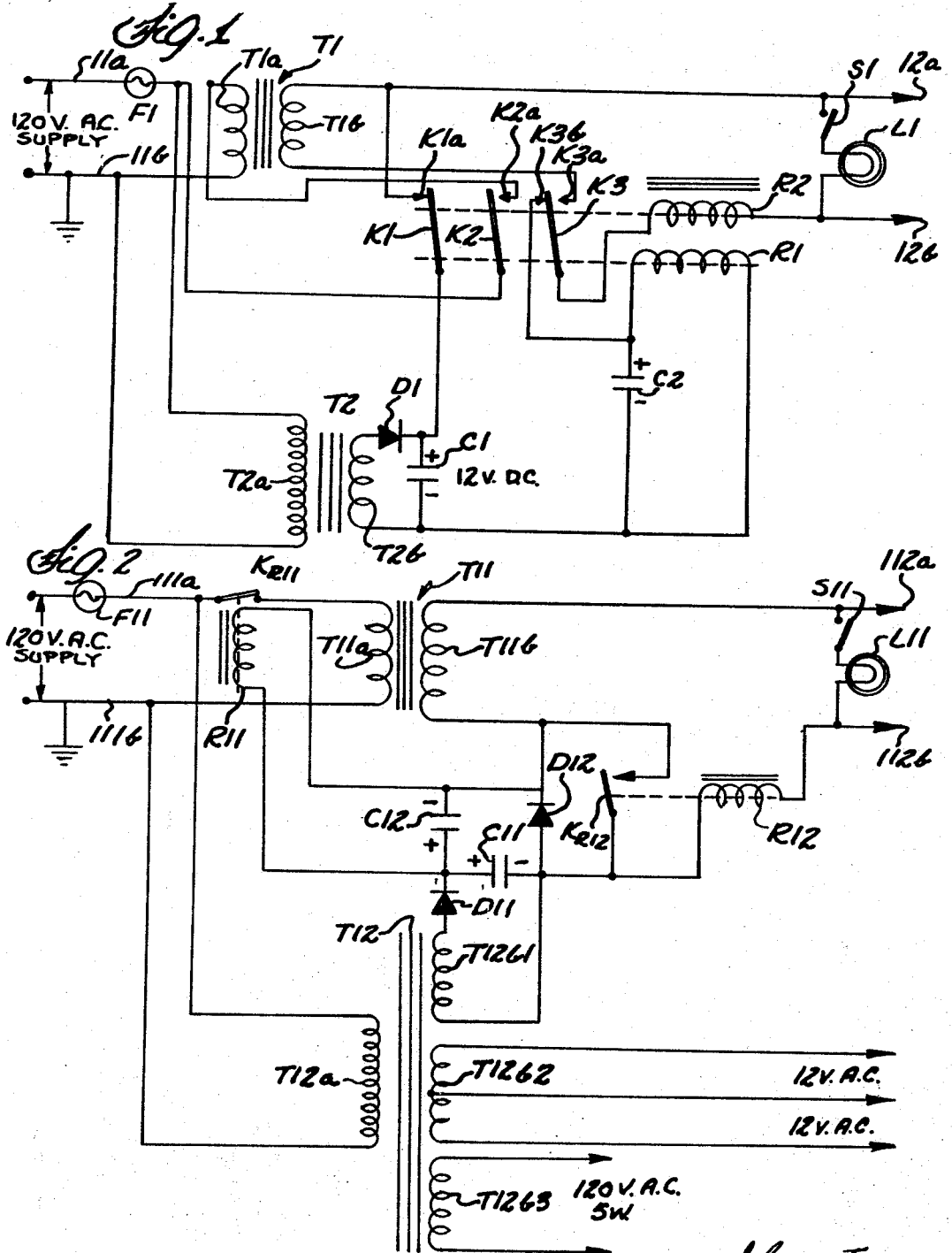

3,344,313
LOAD RESPONSIVE UNGROUNDED ELECTRICAL DISTRIBUTION SYSTEM
Arthur A. Kraus, Sr., Joliet, Ill., assignor, by direct and mesne assignments, to Electronic Safety Controls, Inc., a corporation of Illinois
Filed Apr. 2, 1965, Ser. No. 445,043
10 Claims. (Cl. 317—18)

ABSTRACT OF THE DISCLOSURE

An ungrounded electrical supply system is disclosed which includes an isolation transformer between the main, grounded, power source and the load circuit. Under no-load conditions the power source is disconnected from the transformer primary. Means are provided for sensing the application of a load and for associating the power source, transformer, and load once the load condition is sensed.

---

This invention relates to an electrical distribution system and, more specifically, to an ungrounded electrical distribution system which finds particularly advantageous utilization in residential applications, wherein the main power transformer is "shut off" when there is no external loading. However, it will be readily appreciated that the invention is adaptable to any electrical distribution system.

Many electrical devices are utilized daily which may result in electrical shocks to the users. The danger of such electrical shocks is increased in damp areas, such as basements, laundry rooms, bathrooms, kitchens or industrial areas, and such shocks may prove to be fatal to elderly people or young children. Additionally, many fatalities occur each year as a result of electrical devices falling into swimming pools, bathtubs and the like. Moreover, many fires are started because of sparking between defective electrical cords of electrical devices and nearby grounded metallic objects. These problems arise because all distribution lines feeding residences and business places have one side grounded to protect against lightning and short-circuit hazards.

It is a primary object of the present invention to provide an improved electrical distribution system which eliminates the foregoing problems. More specifically, an object of the present invention is to provide an ungrounded electrical distribution system for a residence or business establishment wherein the system is still protected against lightning and short-circuit hazards. To accomplish this, an isolation transformer is utilized as a main power transformer and is shut off when there is no external loading, the input to the system being grounded and the transformer isolating the system from the grounded input.

Another object is to provide such a system wherein a low power, high voltage line is provided for continuously supplying energizing power to electrical clocks and the like. Additionally, an object is to provide such a system wherein a low voltage line is provided for continuously supplying energizing power to door bells and the like.

A general object of the present invention is to provide an improved electrical distribution system which eliminates shocks hazards and, more particularly, allows a person in a bathtub or in a moist area to handle electrical devices without fear of shock. Another general object is to provide such a system wherein a defective electrical cord cannot spark to a grounded metallic object.

A further general object is to provide such a system wherein the cost of stand-by power is reduced since the main power transformer is placed across the input line only when there is external loading.

In one form of the invention, an electrical distribution system is provided which includes a source of energizing power, a load device and an isolation transformer. Means are provided for conditioning the load device for energization and control means are provided for responding thereto to associate the transformer with the source and the load device with the transformer so that the load device is energized. The conditioning means is operable to disassociate the load device from the transformer and the control means responds thereto to disassociate the transformer from the source. A plurality of load devices and associated conditioning means may be provided. Under such conditions, the control means responds to the conditioning of any load device to associate the transformer with the source and the load device with the transformer. However, the control means operates to disassociate the transformer from the source only when all load devices are disassociated from the transformer by the associated conditioning means.

Other objects and advantages of the present invention will become apparent upon reading the attached detailed description, taken in conjunction with the drawings, wherein:

FIGURE 1 is a first embodiment of an electrical distribution system constructed in accordance with the teachings of the present invention;

FIG. 2 is a second embodiment of an electrical distribution system constructed in accordance with the teachings of the present invention;

Figure 3:
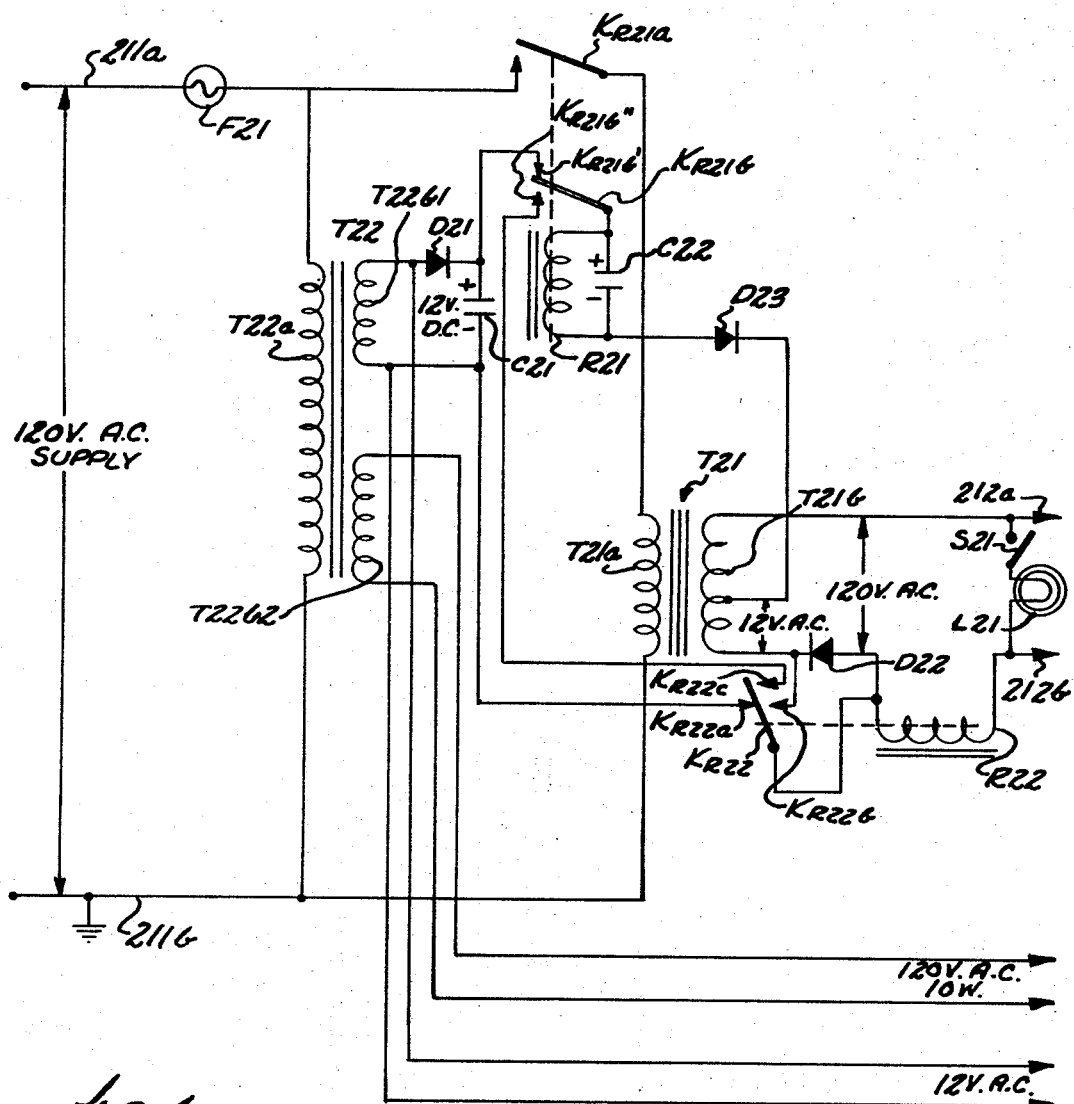
FIG. 3 is a third embodiment of an electrical distribution system constructed in accordance with the teachings of the present invention.

While the invention has been shown and will be described in some detail with reference to particular, exemplary embodiments thereof, there is no intention that it be limited to such detail. Quite to the contrary, it is intended here to embrace all modifications, alternatives and equivalents falling within the spirit and scope of the invention as defined by the appended claims. In this connection, the invention will be described with respect to controlling the supply of single phase power, though it will be readily apparent that it may likewise be adapted to control the supply of multi-phase power.

Referring now to the drawings and more specifically to FIG. 1, a first embodiment of the present invention is shown wherein a main isolation transformer T1 is provided for functioning as the main power transformer and thus for supplying power from supply lines 11a, 11b, shown as 120 volt AC supply lines, to remote load devices. In the exemplary embodiment, only a single load device L1, illustrated as a light, is shown. However, it will be readily apparent that a desired plurality of loading devices may be connected across load lines 12a, 12b associated with the secondary winding T1b of the isolation transformer T1, the number of loading devices being limited by the transformer amperage rating. The 120 volt AC supply lines are connected to the primary winding T1a of the isolation transformer T1 through a fuse F1 and a normally open contact arm K2 associated with control relay energizing windings R1 and R2, the lower supply line 11b being grounded as shown. On the other hand, the load device L1 is connected to the secondary winding T1b through a normally open switch S1, such as a conventional wall switch, through a normally open contact arm K3 also associated with windings R1 and R2, and through the energizing winding R2.

For the purpose of producing a DC control voltage, shown in the exemplary arrangement as a 12 volt DC control voltage, an auxiliary isolation transformer T2 is provided. As may be seen, the primary winding T2a of the transformer T2 is connected across the 120 volt AC supply lines 11a, 11b, whereas the series arrangement of a diode D1 and a capacitor C1 are connected across the secondary winding T2b. In order to provide a reduced voltage across its secondary winding, the transformer T2 is a "step-down" transformer. The reduced AC voltage developed in the secondary winding T2b is half-wave rectified by the diode D1 and a plus-to-minus charge is attained on the capacitor C1 which corresponds to the peak value of the half-wave rectified AC voltage. Consequently, a DC control voltage is continuously developed across the capacitor C1, shown as 12 volts DC in the illustrated embodiment.

In the operation of the system of FIG. 1, the 120 volt AC supply lines 11a, 11b are disconnected from the primary winding T1a of the isolation transformer T1 by means of the contact arm K2 as long as neither the load L1 nor any other load is connected across load lines 12a, 12b associated with the secondary winding T1b. When, for example, the load L1 is connected across load lines 12a, 12b by the closing of the switch S1, a control circuit is completed across the capacitor C1 in the control voltage supply circuit which causes the windings R1 and R2 to be energized. As may be seen, this control circuit is completed from the upper terminal of the capacitor C1 through a contact arm K1 and the associated contact K1a of the windings R1 and R2, through the switch S1 and the load L1, through the energizing winding R2, through the contact arm K3 and the associated contact K3b of the windings R1 and R2, and through the parallel arrangement of the energizing winding R1 and a capacitor C2 to the lower terminal of the capacitor C1. A plus-to-minus charge is attained on the capacitor C2, as shown.

The winding R1 is designed to be sufficiently energized by the current flowing through the control circuit to cause (1) the contact arm K1 to be moved out of engagement with the associated contact K1a so that the control circuit across the capacitor C1 is open circuited, (2) the contact arm K2 to be moved into engagement with the contact K2a so that the 120 volt AC supply lines 11a, 11b are connected across the primary winding T1a of the isolation transformer T1, and (3) the contact arm K3 to be moved out of engagement with the contact K3b and into engagement with the contact K3a so that a load energizing circuit is completed from the secondary winding T1b of the isolation transformer T1 through the switch S1 and the load L1 and through the energizing winding R2. The capacitor C2 functions to stabilize operation of the winding R1. Moreover, during the time period when the contact arms K1, K2 and K3 are being moved to these latter positions, the winding R1 is maintained energized by the current flowing therethrough as a result of the capacitor C2 discharging therethrough. Subsequent to the contact arms attaining these latter positions, the contact arms are maintained in these positions since the winding R2, which is preferably an AC power winding, is energized by the AC current flowing in the load circuit as a result of the AC voltage developed across the secondary winding T1b of the isolation transformer T1. The load device L1 is also energized by this current flowing in the load circuit.

When the switch S1 is thereafter opened, the circuit across the secondary winding T1b of the isolation transformer T1 is opened so that the winding R2 and the load device L1 are de-energized. As a result thereof, the contact arms K1, K2 and K3 return to their normal positions as shown in FIG. 1 and the 120 volt AC supply lines are no longer connected across the primary winding K1a of the isolation transformer T1. In the event a plurality of load devices were connected across the load lines 12a, 12b, it will be readily apparent that the winding R2 would not be deenergized until all of the switches corresponding to switch S1 are opened and all the load devices are deenergized. In other words, each of the load devices would be deenergized independent of the winding R2 which would be deenergized only when all the load devices were deenergized.

Thus, it will be seen that, with the electrical distribution system shown in FIG. 1, power is supplied to the load circuit through the main power transformer T1 only when at least one load device is connected across the load lines 12a, 12b. During the time periods when no load devices are connected across the load lines, only the transformer T2 is connected across the AC supply lines 11a, 11b and, consequently, minimal stand-by power is drawn by this system which results in reduced operating costs. Moreover, a distribution system has been provided wherein neither load line is grounded. Consequently, the problems of present systems resulting from electrical shocks, defective electrical cords and the like are eliminated. Since one of the supply lines is grounded and isolation transformers are utilized, problems resulting from lightning, short circuits and the like are also eliminated.

Referring to FIG. 2, a second embodiment of an electrical distribution system constructed in accordance with the teachings of the present invention is shown. This embodiment likewise includes a main isolation transformer T11 for functioning as a main power transformer and, thus, for supplying power from supply lines 111a, 111b, also disclosed as 120 volt AC supply lines, to remote load devices. The supply line 111b is grounded as shown. Again, only a single load device L11, disclosed as a light, is shown, though a desired plurality of load devices may be connected across load supply lines 112a, 112b associated with the secondary winding T11b of the transformer T11. The 120 volt AC supply lines are connected across the primary winding T11a of the isolation transformer T11 through a fuse F11 and a normally open contact $K_{R11}$ of a control relay R11. On the other hand, the load device L11 is connected across the secondary winding T11b if the isolation transformer T11 through a switch S11, such as a conventional wall switch, through the normally open contact $K_{R12}$ of an AC power relay R12 and through the energizing winding of the relay R12.

For the purpose of supplying DC control voltage to the electrical distribution system, a second isolation transformer T12 is provided which has its primary winding T12a connected across the 120 volt AC supply lines 111a, 111b. The transformer T12 has a first secondary winding T12b1 which has the series arrangement of the diode D11 and a capacitor C11 connected thereacross. The transformer T12 is a "step-down" transformer so that a reduced AC voltage is provided across the secondary winding T11b1. The diode D11 half-wave rectifies the reduced AC voltage and a charge is attained on the capacitor C11 which corresponds to the peak value of the half-wave rectified voltage. Consequently, a low DC voltage is continuously produced across the capacitor C11. Additionally, a second secondary winding T12b2 is provided on the isolation transformer T12 so that a low voltage AC signal is continuously provided by the distribution system (disclosed as a 12 volt AC signal). Further, a third secondary winding T12b3 is provided on the transformer T12 so that a high voltage, lower power AC signal is continuously provided (disclosed as a 120 volt, 5 watt AC signal). These latter AC voltage signals are continuously provided for energizing electrical clocks, doorbells and the like which are to operate continuously.

When no loading devices are connected across the load lines 112a, 112b, the relays R11 and R12 are deenergized so that the associated contacts $K_{R11}$ and $K_{R12}$ are open. Consequently, the 120 volt AC supply lines are disconnected from the primary winding T11a of the main isolation transformer T11. Subsequently, when, for example, the switch S11 is closed to connect the load device L11 across the load lines 112a, 112b, a control circuit is completed from the left-hand terminal of the capacitor C11 through the energizing winding of the relay R11, through the secondary winding T11b of the transformer T11, through the series arrangement of the switch S11 and the load device L11, and through the energizing winding of the relay R12 to the right-hand terminal of the capacitor C11. The relay R11 is designed to be energized in response to the control current flowing therethrough from the capacitor C11 so that the associated contact $K_{R11}$ is closed. For the purpose of stabilizing operation of the relay R11, a second capacitor C12 is connected in parallel therewith which attains a charge thereon as the relay R11 is being energized. It follows then that the primary winding T11a of the isolation transformer T11 is, at this time, connected across the 120 volt AC supply lines so that a desired AC voltage signal is developed in the secondary winding T11b. Consequently, AC current flows through the switch S11 and the load device L11, through the energizing winding of the relay R12, and through a diode D12 which half-wave rectifies the current. It follows that relay R12, which is an AC power relay, is energized. Moreover, it follows that the contact $K_{R12}$ is closed so that the switch S11, the load device L11, and the energizing winding of the relay R12 are connected in series directly across the secondary winding T11b of the isolation transformer T11 and full AC current flows therethrough. Consequently, the load device L11 is energized and the relay R12 is maintained energized.

Thereafter, when the switch S11 is opened, the energizing circuits for the relays R11 and R12 are opened and the relays are deenergized so that the associated contacts $K_{R11}$ and $K_{R12}$ are opened. Consequently, the primary winding T11a of the isolation transformer T11 is again disconnected from the 120 volt AC supply lines so that an AC signal is no longer developed in the secondary winding T11b.

A third embodiment of the present invention is shown in FIG. 3 which likewise employs a main isolation transformer T21 for functioning as a main power transformer and, thus, for supplying AC power from supply lines 211a, 211b, disclosed as 120 volt AC supply lines, to desired remote load devices. The supply line 211b is grounded as shown. Again, only a single load device L21 is shown, in the form of a light, though a desired plurality of load devices may be connected across load lines 212a, 212b. The primary winding T21a of the isolation transformer T21 is connected across the 120 volt AC supply lines through a fuse F21 and a normally open contact $K_{R21a}$ of a control relay R21. The load device L21 is connected across the secondary winding T21b through a switch S21, such as a conventional wall switch, through the energizing winding of an AC power relay R22, and through the parallel arrangement of a diode D22 and a normally open contact arm $K_{R22}$ of the relay R22.

For the purpose of providing DC control voltage, a second isolation transformer T22 is provided which has its primary winding T22a connected across the 120 volt AC supply lines. A first secondary winding T22b1 has a diode D21 and a capacitor C21 connected in series thereacross so that a desired DC voltage (for example, 12 volts DC) is developed across the capacitor C21, the diode D21 half-wave rectifying the AC voltage produced across the secondary winding T22b1 and a charge being attained on the capacitor C21 corresponding to the peak value of the half-wave rectified AC voltage. Additionally, a low voltage AC output signal is continuously provided across a second secondary winding T22b1 provided on the transformer T22 (disclosed as a 12 volt AC signal). Further, a third secondary winding T22b2 is provided on the transformer T22 for continuously providing a high voltage, low power AC signal (disclosed as the 120 volt, 10 watt AC signal). These latter two signals are provided for energizing electric clocks, doorbells and the like which are to operate continuously.

When no load devices are connected across the load lines 212a, 212b, the relays R21 and R22 are deenergized so that their associated contacts are in their normal positions. As a result thereof, the primary winding T21a of the isolation transformer T21 is disconnected from the 120 volt AC supply lines so that no AC signal is developed in the secondary winding T21b. Subsequently, when the switch S21 is closed so that the load device L21 is connected across the load lines 212a, 212b, a control circuit is completed from the upper terminal of the capacitor C21 through contact $K_{R21b'}$ and contact arm $K_{R21b}$, through the parallel arrangement of the energizing winding of the relay R21 and a shunting capacitor C22, through a diode D23, through a portion of the secondary winding T21b of the isolation transformer T21, through the switch S21 and the load device L21, through the energizing winding of the relay R22, and through the contact arm $K_{R22}$ and the associated contact $K_{R22a}$ of the relay R22 to the lower terminal of the capacitor C21. The relay R21 is designed to be energized by the current flowing through the control circuit so that the contact arm $K_{R21b}$ moves out of engagement with contact $K_{R21b'}$ and into engagement with contact $K_{R21b''}$ and so that contact arm $K_{R21a}$ is closed whereby the primary winding T21a of the isolation transformer T21 is connected across the 120 volt AC supply lines. A desired AC voltage is thus developed in the secondary winding T21b which causes AC current to flow through the switch S21 and the load device L21, through the energizing winding of the relay R22, and through the diode D22 which half-wave rectifies the AC current. The relay R22, which is an AC power relay, is energized by the half-wave rectified AC current. When the relay R22 is energized, the contact arm $K_{R22}$ is moved out of engagement with contact $K_{R22a}$ and into engagement with contacts $K_{R22b}$ and $K_{R22c}$. As a result thereof, the switch S21, the load device L21 and the energizing winding of the relay R22 are connected in series directly across the secondary winding T21b of the isolation transformer T21 so that full AC current flows therethrough which energizes the load device L21 and maintains the relay R22 energized. Additionally, the parallel arrangement of the relay R21 and the shunting capacitor C22 is connected across a portion of the secondary winding T21b through diode D23, the contact arm $K_{R22}$ and the associated contact $K_{R22c}$ of the relay R22, and through the contact arm $K_{R21}$ and the associated contact $K_{R21b''}$ of the relay R21. The diode D23 half-wave rectifies the AC signal developed in the associated portion of winding T21b and a charge is attained on the capacitor C22 which corresponds to the peak value of the half-wave rectified AC signal. The charge on the capacitor C22 causes the relay R21 to be maintained energized. The capacitor C22 stabilizes operation of the relay R21 and also insures that the relay is not deenergized during the time interval when its contact arm $K_{R21b}$ moves from engagement with the contact $K_{R21b'}$ into engagement with the contact $K_{R21b''}$.

When the switch S21 is opened, the energizing circuit for the relay R22 is opened so that the relay is deenergized and its contact arm $K_{R22}$ moves out of engagement with contacts $K_{R22b}$ and $K_{R22c}$ and moves back into engagement with contact $K_{R22a}$. Consequently, the energizing circuit for the relay R21 through contact $K_{R22c}$ is opened and the relay R21 is likewise deenergized whereby its contact $K_{R21b}$ moves back into engagement with contact $K_{R21b'}$ and its contact arm $K_{R21a}$ is opened. It follows that the primary winding T21a of the isolation transformer T21 is thereby disconnected from the 120 volt AC supply lines.

Figure 4:
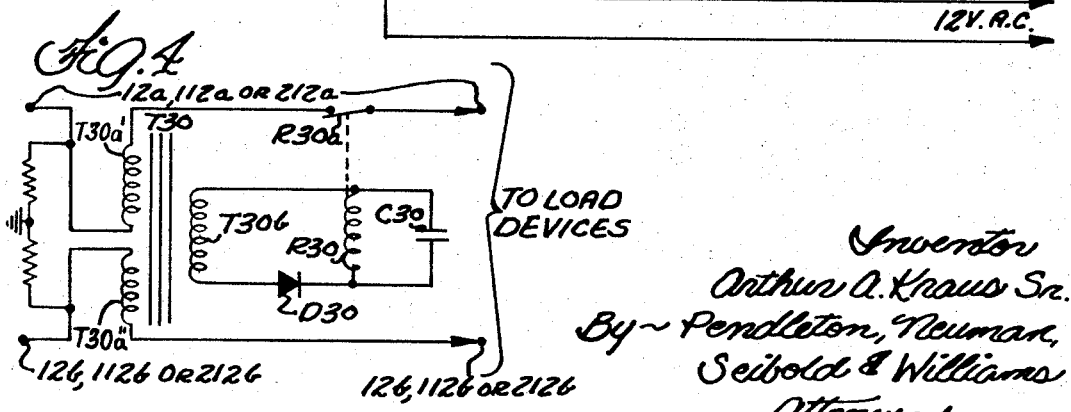
FIG. 4 is a schematic diagram of a safety circuit adaptable for use with the systems of FIGS. 1–3.

In the event a portion of the load circuit for one of the systems should become grounded, a hazardous condition may exist for a user. To overcome this problem, a safety circuit may be provided for detecting such a condition. Referring to FIG. 4, an exemplary safety circuit is shown which functions to stop the flow of current to the load circuit if a ground exists therein. The safety circuit may be connected in the load lines 12a and 12b of FIG. 1, 112a and 112b of FIG. 2 and 212a and 212b of FIG. 3 between the load devices and the respective secondary transformer windings T1*b*, T11*b* and T21*b*. As may be seen, the safety circuit includes a transformer T30 having a pair of balanced primary windings T30*a*' and T30*a*" connected in series with opposite ones of the load lines and a secondary winding T30*b*. The energizing winding of a relay R30 and a capacitor C30 are connected in parallel across the secondary winding T30*b* through a diode or rectifier D30.

Under normal operation conditions, equal current flows in the load lines and no resultant voltage is developed in the secondary winding T30*b* since equal and opposite voltages are induced therein by the equal current flowing in the primary windings T30*a*' and T30*a*". Consequently, the relay R30 is deenergized and its contact R30*a* is closed so that current is permitted to flow through the load circuit and the conditioned load devices. However, if a ground exists in the load circuit, the current flowing in the load lines and through the primary windings T30*a*' and T30*a*" is no longer equal so that a resultant AC voltage is developed in the secondary winding T30*b*. The resultant AC voltage is half-wave rectified by the diode D30 and the relay R30 is energized thereby. At the same time, a charge corresponding to the peak value of the half-wave rectified voltage is attained on the capacitor C30 which functions to stabilize operation of the relay R30. It follows that the relay contact R30*a* is opened so that the flow of current in the load lines to the load devices is stopped.

Thus, it will be seen that the safety circuit functions to prevent the further flow of current to the load circuit in the event any portion thereof is grounded. Moreover, it will be apparent that various other safety arrangements may be utilized. For example, a pair of neon lights with series resistors may be connected from ground to the load lines to provide a visual indication when a ground exists in the load circuit.

In view of the foregoing, it will be seen that electrical distribution systems have been disclosed which controls the supply of AC power to desired load devices such that no power is supplied to the load circuits unless at least one of the load devices is connected across the load lines. In the disclosed arrangements, this is accomplished by disconnecting the main power transformer from the power source when no load devices are connected across the load lines. Moreover, systems have been disclosed which continuously provide low voltage AC signals and high voltage, low wattage AC signals to continuously operating devices such as electrical clocks, doorbells and the like. Since the load supply circuits are not grounded, the source of electrical shocks to users is eliminated. Additionally, the source for sparking between deffective electrical cords and grounded metallic devices is likewise eliminated. Further, it has been found that the stand-by power drawn by the disclosed distribution systems is substantially below that of a system wherein the main power transformer is continuously across the supply lines since, in the disclosed systems, only small isolation transformers, utilized for providing auxiliary and control power, are continuously across the supply lines.

What is claimed is:

1. In an electrical distribution system, the combination which comprises a source of energizing power, an isolation transformer, a remote load circuit including a load device and a switch connected in series, the switch being operable to condition the load device for energization when closed and to cause the energized load device to be deenergized when opened, means including a first relay for causing the transformer to be associated with the source and for causing energizing current to initially flow through the load device when the first relay is energized, means associated with the source for continuously producing a low voltage signal which is applied to the first relay through the load circuit when the switch is closed so that the first relay is energized, and means including a second relay which is energized when energizing current initially flows through the load device for maintaining the transformer in association with the source and for maintaining the flow of energizing current through the load device so that the load device is energized, the second relay being deenergized when the switch is opened so that the transformer is disassociated from the source.

2. In an electrical distribution system, the combination which comprises a source of energizing power, a first isolation transformer, a remote load circuit including a load device and a switch connected in series, the switch being operable to condition the load device for energization when closed and to cause the energized load device to be deenergized when opened, means including a first relay responsive to energization of the first relay for causing the first transformer to be associated with the source and the load circuit to be associated with the first transformer so that energizing current flows therethrough causing the load device to be initially energized, the first relay being deenergized when such associations exist, means including a second relay which is energized when energizing current flows through the load circuit for maintaining the first transformer in association with the source and the load circuit in association with the first transformer so that the load device is maintained energized, the second relay being deenergized when the switch is opened, and means including a second isolation transformer associated with the source for continuously producing a low DC voltage which is applied to the first relay when the switch is initially closed so that the first relay is energized.

3. In an electrical distribution system, the combination which comprises a source of energizing power, a first isolation transformer, a remote load circuit associated with the first isolation transformer including a load device and a switch connected in series, the switch being operable to condition the load device for energization when closed and to cause the energized load device to be deenergized when opened, means including a first relay responsive to energization of the first relay for causing the transformer to be associated with the source so that energizing current is caused to flow through the load circuit whereby the load device is initially energized, means including a second relay which is energized in response to the flow of energizing current through the load circuit for maintaining the flow of energizing current therethrough and for maintaining the first relay energized, the second relay being deenergized when the switch is opened so that the first relay is deenergized, and means including a second isolation transformer associated with the source for continuously producing a low DC voltage which is applied to the first relay when the switch is initially closed so that the first relay is energized.

4. In an electrical distribution system, the combination which comprises a source of energizing power, an isolation transformer, a remote load circuit including a load device and a switch connected in series, the switch being operable to condition the load device for energization when closed and to cause the energized load device to be deenergized when opened, means including a first relay for causing the transformer to be associated with the source and for causing energizing current to initially flow through the load device when the first relay is energized, means associated with the source for continuously producing a low voltage signal which is applied to the first relay through the load circuit when the switch is closed so that the first relay is energized, means including a second relay which is energized when energizing current initially flows through the load device for maintaining the transformer in association with the source and for maintaining the flow of energizing current through the load device so that the load device is energized, the second relay being deenergized when the switch is opened so that the transformer is disassociated from the source, and means including a third relay energized when a ground exists in the load device circuitry for preventing the further flow of current through the load device.

5. In an electrical distribution system, the combination which comprises a source of energizing power, an isolation transformer, a load circuit completing a conductive path when a load is applied thereto, means for producing a first voltage applied to the load circuit when the conductive path is initially completed, means responsive to the completion of the conductive path in the load circuit for causing the transformer to be associated with the source and for causing energizing current to initially flow through the load and means responsive to the flow of energizing current for maintaining the transformer in association with the source and for maintaining the flow of energizing current through the load circuit.

6. In an electrical distribution system, the combination which comprises a source of energizing power, an isolation transformer, a load circuit completing a conductive path when a load is applied thereto, means generating a voltage applied to the load circuit when the conductive path is initially completed, means responsive to the flow of current in the load circuit for causing the transformer to be associated with the source and with the load circuit for causing energizing current to flow in the load circuit and for causing said voltage generating means to be dis-associated from the load.

7. In an electrical distribution system, the combination which comprises a source of energizing power, an isolation transformer, a load circuit completing a conductive path when a load is applied thereto, means generating a voltage applied to the load circuit when the conductive path is initially completed, means responsive to the flow of current in the load circuit for causing the transformer to be associated with the source and with the load circuit for causing energizing current to flow in the load circuit.

8. In an electrical distribution system, the combination which comprises a source of energizing power, an isolation transformer with primary and secondary windings, a load circuit completing a conductive path when a load is applied thereto, means responsive to the completion of a conductive path in the load circuit for causing the primary winding of said transformer to become associated with said source of energizing power, said secondary winding being connected to said load circuit whereby energizing current is supplied to said load circuit through said transformer.

9. The combination of claim 8 further including means for preventing energizing current from flowing to the load circuit when a portion of the load circuit becomes grounded.

10. In an electrical distribution system, the combination which comprises a grounded source of energizing power, an isolation transformer with primary and secondary windings, said secondary winding being ungrounded, a load circuit completing a conductive path when a load is applied thereto, means responsive to the completion of a conductive path in the load circuit for establishing an electrical connection between said grounded source and said load circuit through said transformer whereby energizing current is supplied to said load circuit through said transformer.

References Cited

UNITED STATES PATENTS

| 2,114,687 | 4/1938 | Schmitt | 317—18 X |
| 3,168,682 | 2/1965 | Moore et al. | 317—18 |
| 3,253,188 | 5/1966 | Nissel | 317—18 X |

FOREIGN PATENTS

| 446,299 | 4/1936 | Great Britain. |
| 487,935 | 6/1938 | Great Britain. |
| 679,789 | 9/1952 | Great Britain. |
| 727,966 | 4/1955 | Great Britain. |
| 764,965 | 1/1957 | Great Britain. |

MILTON O. HIRSHFIELD, *Primary Examiner.*

R. V. LUPO, *Assistant Examiner.*